US011200212B2

(12) United States Patent
Rudolf et al.

(10) Patent No.: US 11,200,212 B2
(45) Date of Patent: Dec. 14, 2021

(54) DOCUMENTING MODIFICATIONS TO CONFIGURATION FILE

(71) Applicant: SAP SE, Walldorf (DE)

(72) Inventors: Michael Rudolf, Heidelberg (DE); Sebastian Kook, Walldorf (DE); Kai Morich, Hockenheim (DE)

(73) Assignee: SAP SE, Walldorf (DE)

( * ) Notice: Subject to any disclaimer, the term of this patent is extended or adjusted under 35 U.S.C. 154(b) by 295 days.

(21) Appl. No.: 16/222,226

(22) Filed: Dec. 17, 2018

(65) Prior Publication Data

US 2020/0192875 A1  Jun. 18, 2020

(51) Int. Cl.
*G06F 16/21* (2019.01)
*G06F 16/23* (2019.01)
*G06F 16/28* (2019.01)
*G06F 16/93* (2019.01)

(52) U.S. Cl.
CPC .......... *G06F 16/21* (2019.01); *G06F 16/2358* (2019.01); *G06F 16/284* (2019.01); *G06F 16/93* (2019.01)

(58) Field of Classification Search
CPC .... G06F 16/21; G06F 16/2358; G06F 16/284; G06F 16/93
USPC ........................................................ 707/804
See application file for complete search history.

(56) References Cited

U.S. PATENT DOCUMENTS

| 8,271,536 | B2 * | 9/2012 | Amradkar | H04L 63/0807 |
| | | | | 707/802 |
| 8,869,099 | B2 * | 10/2014 | Kothari | G06Q 10/06 |
| | | | | 717/104 |
| 9,356,962 | B2 * | 5/2016 | Ilieva | G06F 16/282 |
| 9,495,143 | B2 * | 11/2016 | Mellor | H04L 41/0803 |
| 2013/0031245 | A1 * | 1/2013 | Subramanian | H04L 29/06 |
| | | | | 709/224 |
| 2013/0198637 | A1 * | 8/2013 | Childers, Jr. | H04L 41/5064 |
| | | | | 715/735 |
| 2016/0147612 | A1 * | 5/2016 | Schefe | G06F 11/1469 |
| | | | | 714/19 |

(Continued)

OTHER PUBLICATIONS

Al-Shardan, Mona Misfer, et al., "Configuration as a Service in Multi-Tenant Enterprise Resource Planning System", Lecture Notes on Software Engineering, vol. 3, Nol. 2, May 2015, pp. 95-100.*

(Continued)

*Primary Examiner* — Robert Stevens
(74) *Attorney, Agent, or Firm* — Mintz Levin Cohn Ferris Glovsky and Popeo, P.C.

(57) ABSTRACT

This disclosure describes documenting modifications to configuration file that can affect (e.g., change) behavior of a component of a service provided by a database management system. The service can collect metadata associated with a request to modify a configuration file affecting the behavior of the component of the service. The service can modify the configuration file in response to the request. The modification can change the behavior of the component of the service. The service can generate data representing documentation of the modification to the configuration file and the metadata. The data can represent the documentation being configured for storage by the database management system. Related apparatuses, systems, methods, techniques and articles are also described.

17 Claims, 8 Drawing Sheets

(56) References Cited

U.S. PATENT DOCUMENTS

| | | | |
|---|---|---|---|
| 2016/0147852 A1* | 5/2016 | Effern | G06F 11/3409 707/756 |
| 2018/0314518 A1* | 11/2018 | Ari | G06F 16/137 |
| 2019/0102384 A1* | 4/2019 | Hung | G06F 9/5077 |
| 2019/0102411 A1* | 4/2019 | Hung | H04L 41/0856 |

OTHER PUBLICATIONS

Krebs, Rouven, et al., "Architectural Concerns in Multi-Tenant SaaS Applications", CLOSER-2012, ©2012 SCITEPRESS, pp. 426-431.*

Bezemer, Cor-Paul, et al., "Challenges of Reengineering into Multi-Tenant SaaS Applications", Delft Univ. of Technology, Software Engineering Research Group, Technical Report Series, Report TUD-SERG-2010-012, ©2010, 16 pages.*

Madduri, Hari, et al., "A configuration management database architecture in support of IBM Service Management", IBM Systems Journal, vol. 46, No. 3, 2007, pp. 441-457.*

Kim, Minkyong, et al., "Building scalable, secure, multi-tenant cloud services on IBM Bluemix", IBM Journal of Research & Development, vol. 60, No. 2/3, Paper 8, pp. 1-12.*

Guo, Chang Jie, et al., "A Framework for Native Multi-Tenancy Application Development and Management", CEC-EEE 2007, Tokyo, Japan, Jul. 23-26, 2007, pp. 551-558.*

"Column-oriented DBMS", Wikipedia, downloaded from: en.wikipedia.org/wiki/Column-oriented_DBMS on Dec. 3, 2020, pp. 1-5.*

Walraven, Stefan, et al., "A Middleware Layer for Flexible and Cost-Efficient Multi-tenant Applications", Middleware 2011, © IFIP International Federation for Information Processing 2011, pp. 370-389.*

Mietzner, Ralph, et al., "Defining Composite Configurable SaaS Application Packages Using SCA, Variability Descriptors and Multi-Tenancy Patterns", ICIW 2008, Athens, Greece, Jun. 8-13, 2008, pp. 156-161.*

Sun, Wei, et al., "Software as a Service: Configuration and Customization Perspectives", SERVICES-2 2008, Beijing, China, Sep. 23-26, 2008, pp. 18-24.*

Strauch, Steve, et al., "Enabling Tenant-Aware Administration and Management for JBI Environments", SOCA 2012, Taipei, Taiwan, Dec. 17-19, 2012, 8 pages.*

Microsoft Computer Dictionary, Fourth Edition, Microsoft Press, Redmond, WA, © 1999, p. 107.*

* cited by examiner

DOCUMENTING MODIFICATIONS TO CONFIGURATION FILE

TECHNICAL FIELD

The subject matter described herein relates to documenting modifications to at least one configuration file that can affect (e.g., change) the behavior of a component of a service provided by a database management system.

BACKGROUND

A database management system, such as SAP HANA, often provides several services, each possibly having one or more components. The behavior of each component can be influenced by a configuration file that can be specific to the service for that component, or can be service-independent. Configuration files can be organized in layers, with configuration parameters specified in configuration files on higher layers taking precedence over parameters specified in file on lower layers. There can be one configuration file per service per layer. The specific behavior of a component of a service can be altered by modifying that component's configuration parameters within the configuration file. Such modification is traditionally not documented. This lack of documentation results in an undesirable failure of accurately understanding—substantially subsequent to the modification—the details including the location of the modification within the configuration file, the reason of the modification, the actors making the modification, and the like. Therefore, there exists a need to enhance configuration intelligence capabilities that help comprehend (i.e., understand or reconstruct) configuration changes to the configuration file.

SUMMARY

In one aspect, a service provided by a database management system can collect metadata associated with a request to modify a configuration file. The service can modify the configuration file in response to the request. The modification can change the behavior of a component of the service. The service can generate data representing documentation of the modification to the configuration file and the metadata. The data can represent the documentation being configured for storage by the database management system.

In some variations one or more of the following features can optionally be included in any feasible combination. The database management system can be a relational database management system regardless of its specific architecture (e.g., column-oriented, row-oriented, in-memory, disk-based, etc.). The service can be one of a plurality of services provided by the database management system. The component can be one of a plurality of components of the service. The database management system can have a default configuration layer, a database tenant layer, and a host layer. The configuration file can be one of: a first configuration file (e.g., global or service-specific configuration file) having a default setting and stored in the default configuration layer; a second configuration file configured to override the default setting and stored in the database tenant layer; and a third configuration file configured to modify database behavior of a host within the database management system and stored in the host layer.

The modification of the configuration file can be performed by one of: a first database administrator while configuring the database management system to match hardware settings of a customer serviced by the database management system; a second database administrator for a tenant of the database management system while adapting the service for a particular use case; and a support worker while troubleshooting the database management system. The plurality of parameters can include: the modification to the configuration file; and at least one of: a reason due to which the configuration file was modified, time when the configuration file was modified, application used for requesting a modification of the configuration file, and an identification of a user who requested the modification of the configuration file.

The generating of the data representing the documentation can include transmitting, by the service, metadata of the modification to the configuration file to a catalog master service that stores the metadata of the modification in an internal database table within the database management system. There is one catalog master service for each tenant in a multi-tenant database. In case that catalog master service is unavailable, such as temporarily (for example, when the catalog master service is in the process of starting up and cannot be contacted or process requests for storing data yet), the data documenting the modification is placed in a backlog at the service processing the modification request. Data from the backlog is then transferred to the catalog master service for storing the data at some point in time after the request for modifying the configuration was processed by the initial service.

The service can display the modification stored in the internal database table from an in-memory storage structure of the database management system. If a lock file exists, the service can recover the lock file. If a lock file does not exist, the service can create a new lock file. The recovered lock file or the new lock file can be used during performance of the modification of the configuration file.

In another aspect, a non-transitory computer-readable medium can store instructions that, when executed by a computer, cause a service provided by a database management system to perform operations comprising: collecting metadata associated with a request to modify a configuration file; modifying the configuration file in response to the request, the modification changing the behavior of a component of the service; and generating data representing documentation of the modification to the configuration file and the metadata, the data representing the documentation being configured for storage by the database management system.

In some variations one or more of the following features can optionally be included in any feasible combination. The database management system can be an in-memory, column-oriented, relational database management system.

In yet another aspect, a database management system can include: a programmable processor providing a service; and a machine-readable medium storing instructions that, when executed by the programmable processor, cause the service to perform at least some of the following operations. The service can modify the configuration file in response to the request. The modification can change the behavior of a component of the service. The service can generate data representing documentation of the modification to the configuration file and the metadata. The data can represent the documentation being configured for storage by the database management system.

In some variations one or more of the following features can optionally be included in any feasible combination. The generating of the data representing the documentation can include transmitting metadata of the modification to the configuration file to a catalog master service that stores the metadata of the modification in an internal database table within the database management system. The transmitting of aforementioned metadata to a catalog master service can be delayed until some point in time after the modification to the configuration file was performed by means of a backlog within the service performing the modification.

Related apparatuses, systems, methods, techniques, articles, non-transitory computer readable media, non-transitory computer program products are also described and within the scope of this disclosure.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to SAP HANA, it should be readily understood that such features are not intended to be limiting and can be extended to any database management system. The claims that follow this disclosure are intended to define the scope of the protected subject matter.

BRIEF DESCRIPTION OF DRAWINGS

Like reference numerals in the description of the drawings below indicate like elements.

DETAILED DESCRIPTION

Figure 1:
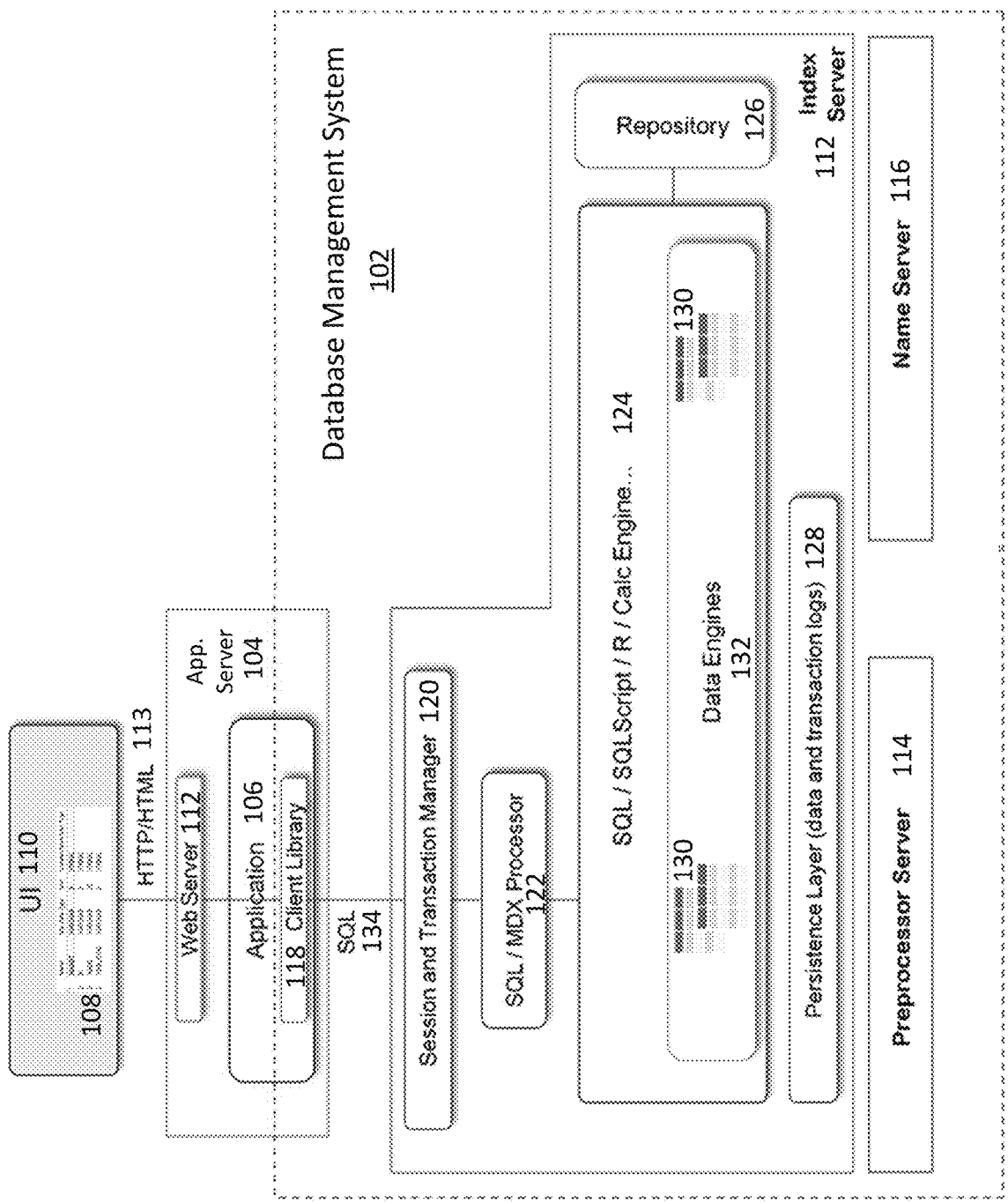
FIG. 1 illustrates a database management system configured to document modifications to a configuration file that can affect (e.g., change) the behavior of a component of a service amongst multiple services provided by the database management system.

FIG. 1 illustrates a database management system 102 configured to document modifications to a configuration file that can affect (e.g., change) the behavior of a component of a service amongst multiple services provided by the database management system 102. The database management system 102 can provide one or more services, such as an index server 112, a preprocessor server 114, or a name server 116. Each service can have one or more components, such as tracing, job execution, query plan cache or index management components. Some components (e.g., query plan caching and index management) can be specific to a service, while other components (e.g., tracing and job execution) can be service-independent.

Each component that is specific to a service can act (i.e., behave) in a manner dictated by a configuration file specific to that service. Some service-independent components can act (i.e., behave) in a manner governed by a global configuration file. Other service-independent components (such as tracing) can be configured differently for different services by means of service-specific configuration files, so that such components behave differently in different services. Further, in some implementations, existing components can be reused and recombined to create new services, such that a component only used by a specific service in the past may be reused in a newly created service in the future as a response to changing requirements. The configuration files can be distributed within the architecture of the database management system 102. For example, the database management system 102 can have a default configuration layer, a database tenant layer, and a host layer; and the configuration file can be one of: a first configuration file (more specifically, a global or service-specific configuration file) having a default setting and stored in the default configuration layer, a second configuration file configured to override the default setting and stored in the database tenant layer, and a third configuration file configured to modify database behavior of a host within the database management system and stored in the host layer.

Actions (i.e., behavior) of a component may need to be modified to reflect the circumstances and address the needs of the context they run in, such as the degree of parallelism or the amount of memory available at a particular site of a customer serviced by the database management system 102. Actions (i.e., behavior) of any component can be modified by making modifications to the corresponding configuration file. As described in greater detail below by FIGS. 2-8, the database management system 102 described herein detects modifications to configuration files that can be distributed across the database management system 102, and can subsequently document such modifications along with associated metadata. The metadata can include the location of the modification within a configuration file, the reason of the modification, the actors making the modification, the time of modification, and/or the like.

The computing architecture of the database management system 102 is now described. The database management system 102 can communicate with an application server 104. The application server 104 can host an application 106, content 108 from which can be transmitted to a user interface 110 via the web server 112. The web server 112 can transmit the content to the user interface 110 via HyperText Transfer Protocol (HTTP) encoded in Hyper Text Markup Language (HTML) 113.

The database management system 102 can include an index server 112, a preprocessor server 114, a name server 116, and a client library 118 of the application server 104. The index server 104 can include a session and transaction manager 120, a processor (e.g., structured query language (SQL) processor/multi-dimension expressions (MDX) processor) 122, an engine (e.g., SQL/SQL script engine) 124, a repository 126, and a persistence layer 128. The engine 124 can include data stores 130 and data engines 132 to process the data in those data stores 130. The persistence layer 128 can include data and transaction logs, which are used to persist the data in the data engines 132, typically arranged in relational database tables. There can be one or more index servers 104 with database tables structuring the data in the data engines 132 for each tenant. One of these possibly multiple index servers 104 for a tenant can be responsible for storing metadata about the arrangement of data in the data engines 132, which is also referred to as catalog master service herein.

Each tenant can have a separate catalog master service so as to isolate tenants from each other, because a user in one tenant database must not see the catalog metadata in another tenant. The catalog master service is an index server (also referred to as the "master" index server) and is responsible for the metadata of the database (more specifically, the tenant). Such metadata includes information about database tables, table columns and their data types, constraints (such as primary and foreign keys, sequences, uniqueness of values, any other constraints, and/or any combination thereof), table parts and their location if distributed across multiple index servers, stored procedures, triggers, schemas, and/or the like. Such metadata may not be the same as the metadata associated with a configuration change—the metadata associated with a configuration change is collected by the service receiving the modification request and sent to the catalog master (through the backlog), so that the catalog master stores the information in an internal database table. At that point, metadata about a configuration change becomes ordinary data and is inserted into a relational database table, which is not accessible to clients and therefore internal to the system.

The application 106 can access and manage content within the index server 112 via a query programming language 134, such as SQL or MDX.

The database management system 102 can have its own scripting language (e.g., SQLScript). The scripting language can be based on functions that operate on tables 128 using queries (e.g., SQL queries) for set processing, and can therefore be parallelizable over multiple processors 122.

Further, the database management system 102 can support a framework for the installation of specialized and optimized functional libraries 118, which can be tightly integrated with different data engines 132. The functions within the library 118 can be called directly from within the scripting language.

The query language (e.g., SQL) 134 and the scripting language (e.g., SQLScript) can be implemented using a common infrastructure of built-in functions of the data engine 132 that have access to various meta definitions, such as definitions of relational tables, columns, views, and indexes, and definitions of procedures for the scripting language (e.g., SQLScript). This metadata can be stored in one common catalog.

The database persistence layer 128 can be responsible for durability and atomicity of transactions. It can ensure that the database 126 can be restored to the most recent committed state after a restart and that transactions can be either completely executed or completely undone.

The index server 112 can use the preprocessor server 114 for analyzing text data and extracting the information on which the text search capabilities are based. The name server 116 can own the information about the topology of the database management system 102. In a distributed system, the name server 116 can know where the components are running and which data is located on which server.

Figure 2:
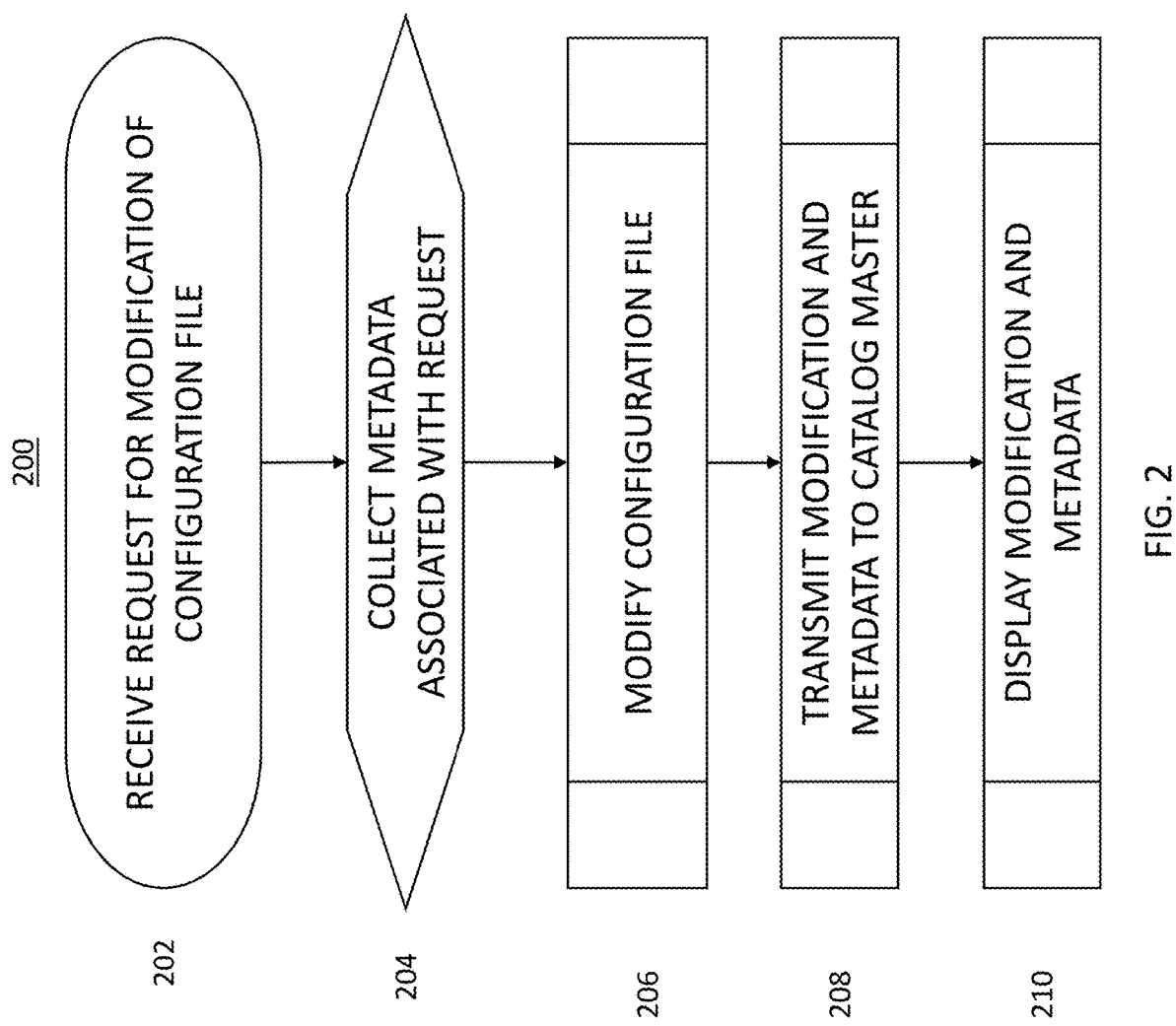
FIG. 2 illustrates a process documenting and displaying modifications to a configuration file and associated metadata.

FIG. 2 illustrates a process 200 documenting and displaying modifications to a configuration file and associated metadata. A service provided by the database management system 102 can receive, at 202, a request for modification of a configuration file. This service can be responsible for, but need not be limited to, name lookup, query compilation or query processing. The service can receive the request from one or more of: a first database administrator while configuring the database management system 102 to match hardware settings of a customer serviced by the database management system 102, a second database administrator for a tenant of the database management system 102 while adapting the service for a particular use case, and a support worker while troubleshooting the database management system 102.

The service can collect, at 204, metadata associated with the request. The metadata can include, but need not be limited to, a reason for which the modification to the configuration file is being requested, the time when the configuration file should be modified, the application used for issuing the request for modification, and an identification of a user requesting the modification. The metadata may also include a hash value representing the contents of the configuration file after the change has been applied, so as the be able to identify modifications to the configuration file that were not requested to a service but accomplished by directly manipulating the file. In some embodiments the reason for the modification to the configuration file may already be specified by the user at the time of requesting the modification and be part of the request. In other variations the service processing the request can query the reason for the modification from the user in an interactive fashion. Other metadata may be determined completely automatically (e.g., by consulting the system clock for the current date and time, by extracting the user identification from the session in which the request for modification was issued, and/or any other suitable process).

The service can modify, at 206, the configuration file based on the request. Instead of directly writing to the configuration file, the service can write to a temporary file instead and then perform an atomic rename operation provided by the file system. This approach prevents that another service that reads the configuration file at the same time sees an inconsistent state, which can consist of parts of the old state before and parts of the new state after the file modification. The name of the temporary file can be made unique by including the operating system's process and thread identifiers as well as the hostname, thereby ensuring that no other service that intends to write to the same configuration file at the same time operates with the same temporary file.

The service can transmit, at 208, modification and associated metadata to the catalog master service, which can document the modification and associated metadata.

The documentation of the modification and associated metadata can be displayed, at 210, in a table 108 that is part of a GUI 110 produced by a web server 112 and transmitted in the form of HTML content via HTTP 113 from an application server 104. In some implementations, the service can display the modification and the associated metadata. The display can be on a graphical user interface of a system administrator that/who manages the database management system 102. The display of configuration modifications can be a separate process from the modification itself, and such display can happen independently and at different points in time. That is, the display may not be tied to the modification process in most implementations.

Figure 3:
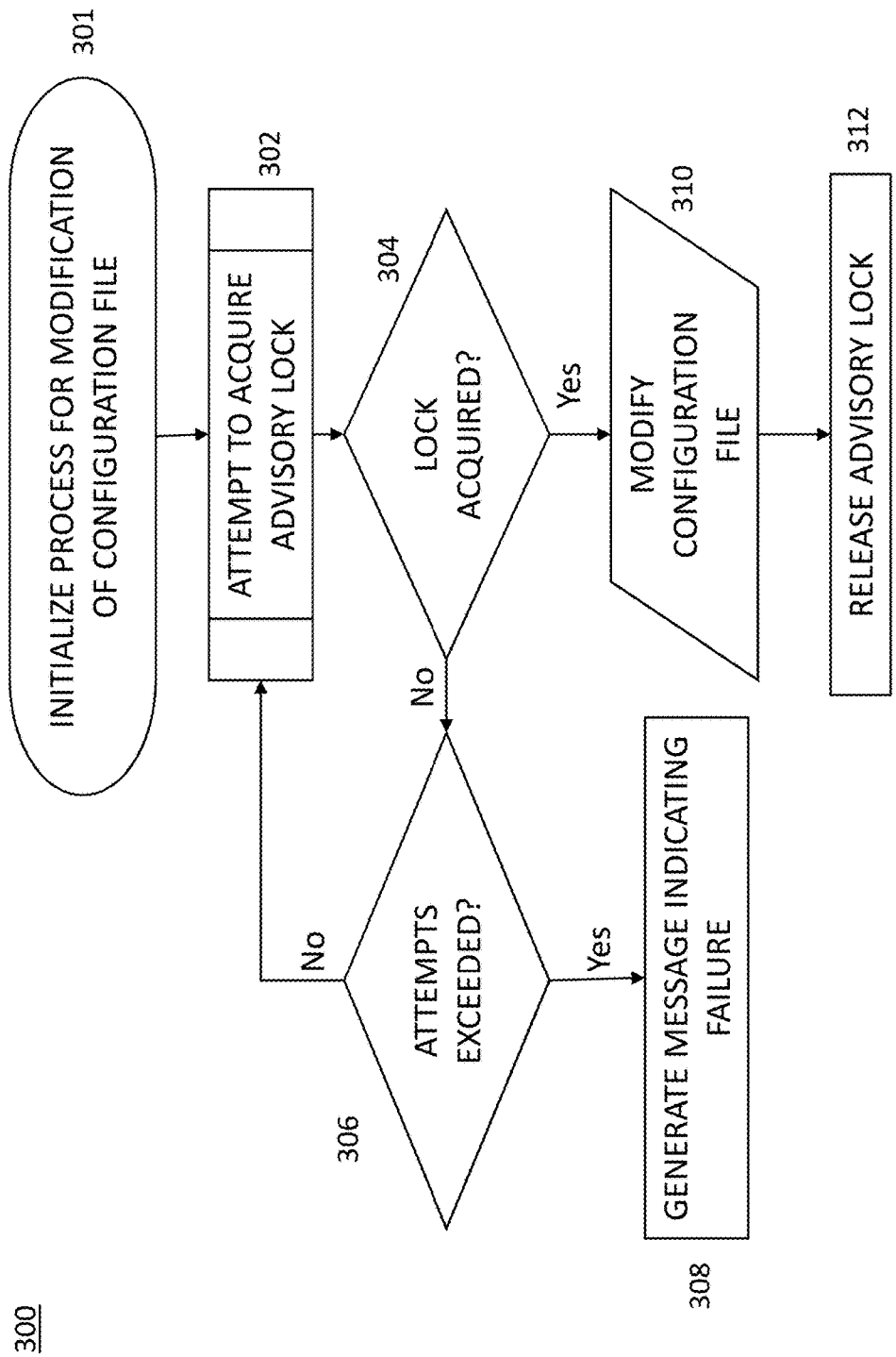
FIG. 3 illustrates a process to acquire an advisory lock file, modify the configuration file, and release an advisory lock associated with the advisory lock file after the modification.

FIG. 3 illustrates a process 300 to acquire an advisory lock by means of a dedicated lock file, modify the configuration file, and release an advisory lock associated with the advisory lock file after the modification. The term advisory lock file is also referred to as a lock file herein. The process 300 for modification of the configuration file can be initialized at 301. The service can attempt, at 302, to acquire an advisory lock file. The process of acquiring the advisory lock file is described in greater detail below by the process 400 of FIG. 4. The service can determine, at 304, whether the lock file has been acquired. If the lock file has not been acquired, the service can determine, at 306, whether the number of attempts to acquire the lock file have exceeded a threshold number. Such number of attempts is configurable by the database management system 102. If the number of attempts to acquire the lock file have not exceeded the threshold number, the service can attempt to acquire the lock file again at 302. If the number of attempts to acquire the lock file have exceeded the threshold number, the service can generate, at 308, a message indicating failure. If the service determines at 304 that the lock file has been acquired, the service can modify, at 310, the configuration file. The service can release, at 312, the advisory lock.

Figure 4:
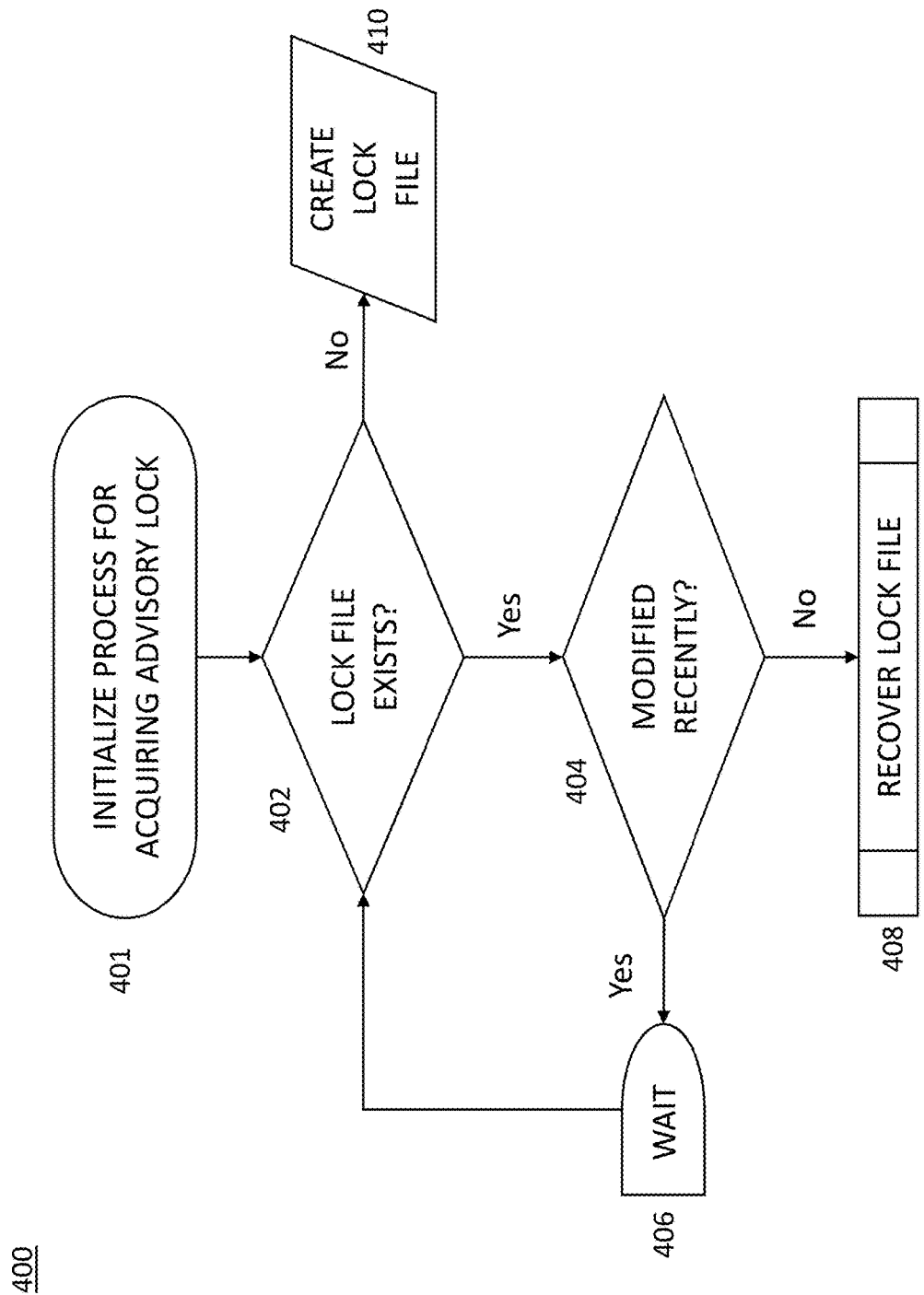
FIG. 4 illustrates a process of acquiring an advisory lock.

FIG. 4 illustrates a process 400 of acquiring an advisory lock. The lock file can be an expression of the intent of the service performing process 400 to exclusively work on a configuration file and as such is an advice for other services aiming to do the same, thereby enabling coordination amongst services. The lock file can be located in the same directory as the configuration file to work on, and therefore on the same storage device (e.g., a network share), so that communicating such intent does not require a separate communication channel, which might exhibit different error behavior. The process 400 is performed prior to the modification of the configuration file.

The process 400 for acquiring the advisory lock can be initialized at 401. The service can determine, at 402, whether a lock file exists. If the lock file exists, the service can determine, at 404, whether the lock file has been modified recently, and more specifically within the past lock retention period, which is a past preset amount of time. The lock retention period is configurable/adjustable. The lock can correspond to a lease, and the lock retention period can correspond to a term of that lease. The service can make this determination of whether the lock file has been modified recently by comparing the lock file's last modification timestamp with the lock retention period.

If the lock file has been modified recently (i.e., within the past preset amount of time), the service can wait, at 406, for a configurable/adjustable amount of time. The service may perform the wait and check cycle a few times. If the lock file has not been modified recently, the service can recover, at 408, the lock file. The process of recovering the lock file is described in greater detail below by the process 500 of FIG. 5. The service can recover the lock file by writing the unique name of the temporary file that will be renamed to the configuration file into the lock file, which in effect claims the lock. If the service determines at 402 that a lock file does not exist, the service can create a lock file at 410. The creation of the lock file involves opening the newly created lock file exclusively, and writing the name of the temporary configuration file that lock file guards as a unique identifier into the lock file. After 410, the control returns to 202.

Figure 5:
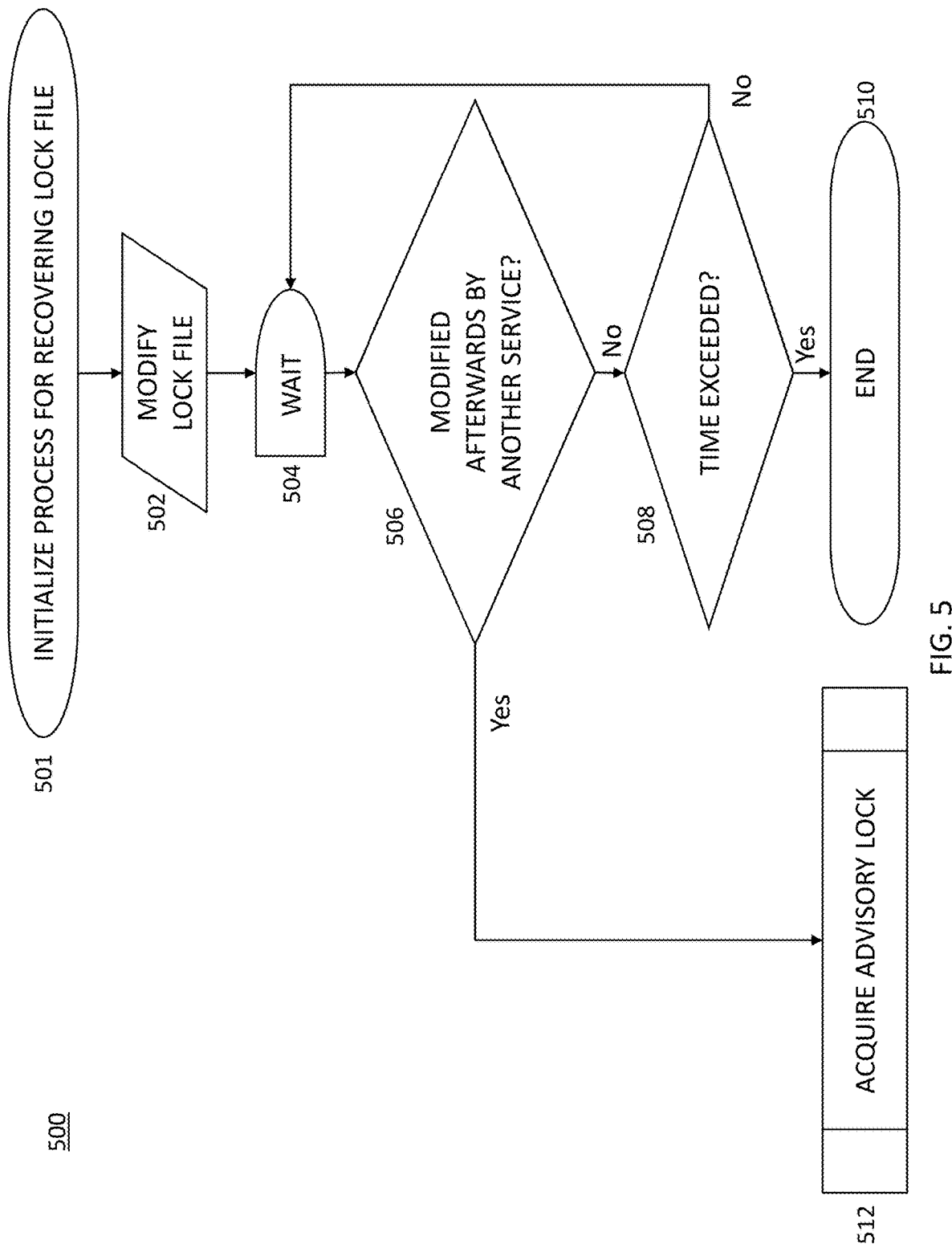
FIG. 5 illustrates a process for recovering the lock file.

FIG. 5 illustrates a process 500 for recovering the lock file. The process 500 for recovering the lock file can be initialized at 501. The service can update, at 502, the lock file by writing the name of its temporary configuration file into it. The service can wait at 504. The service can determine, at 506, whether the lock file has been modified afterwards by another service provided by the database management system 102. The other service mentioned here can be one that is responsible for name lookup, query compilation or query processing. If the lock file has not been modified afterwards by another service, the service can determine, at 508, whether time has been exceeded. This time is also referred to as the lock retention period. If the time has been exceeded, the service can end the process 500 at 510. If the time has not been exceeded, the service can wait at 504. If the service determines at 506 that the lock file has been modified afterwards by another service, the service can acquire, at 512, the advisory lock via the process 400 of FIG. 4.

Figure 6:
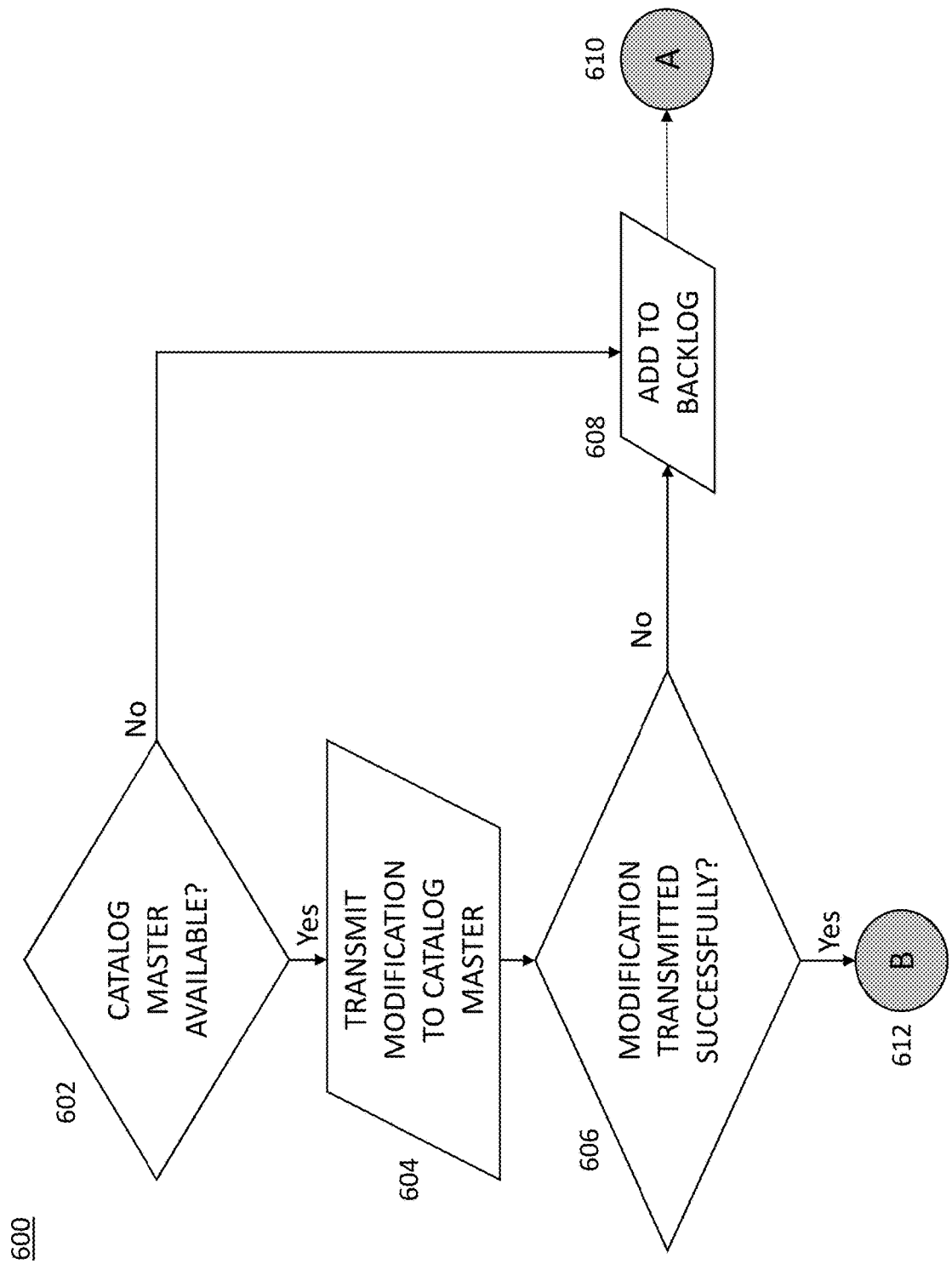
FIG. 6 illustrates a process for transmitting the modifications made to the configuration file and associated metadata.

FIG. 6 illustrates a process 600 for transmitting the modifications made to the configuration file and associated metadata. The service can determine, at 602, whether a catalog master is available. If the catalog master is available, the service can transmit, at 604, the modification to the catalog master. The service can determine, at 606, whether the modification was transmitted successfully. If the modification was not transmitted successfully, the service can add, at 608, the modification to the backlog for sending later. The service can also add, at 608, the modification to the backlog when the catalog master is unavailable. The service can subsequently implement, at 610, a process 700 of backlog, as described in further detail below by FIG. 7. If the modification has been transmitted successfully, the service can implement, at 612, a process of checking for modifications to the configuration file at suitable points in time (e.g., whenever the configuration file should be modified, or during the service startup, or when the configuration file is read initially, or periodically, or any combination of these), and documenting change when the hash of contents of the configuration file is unknown (which is the case when external change—i.e., changes not requested to a service but accomplished by directly manipulating the configuration file—occurs), as noted in greater detail below by FIG. 8.

Figure 7:
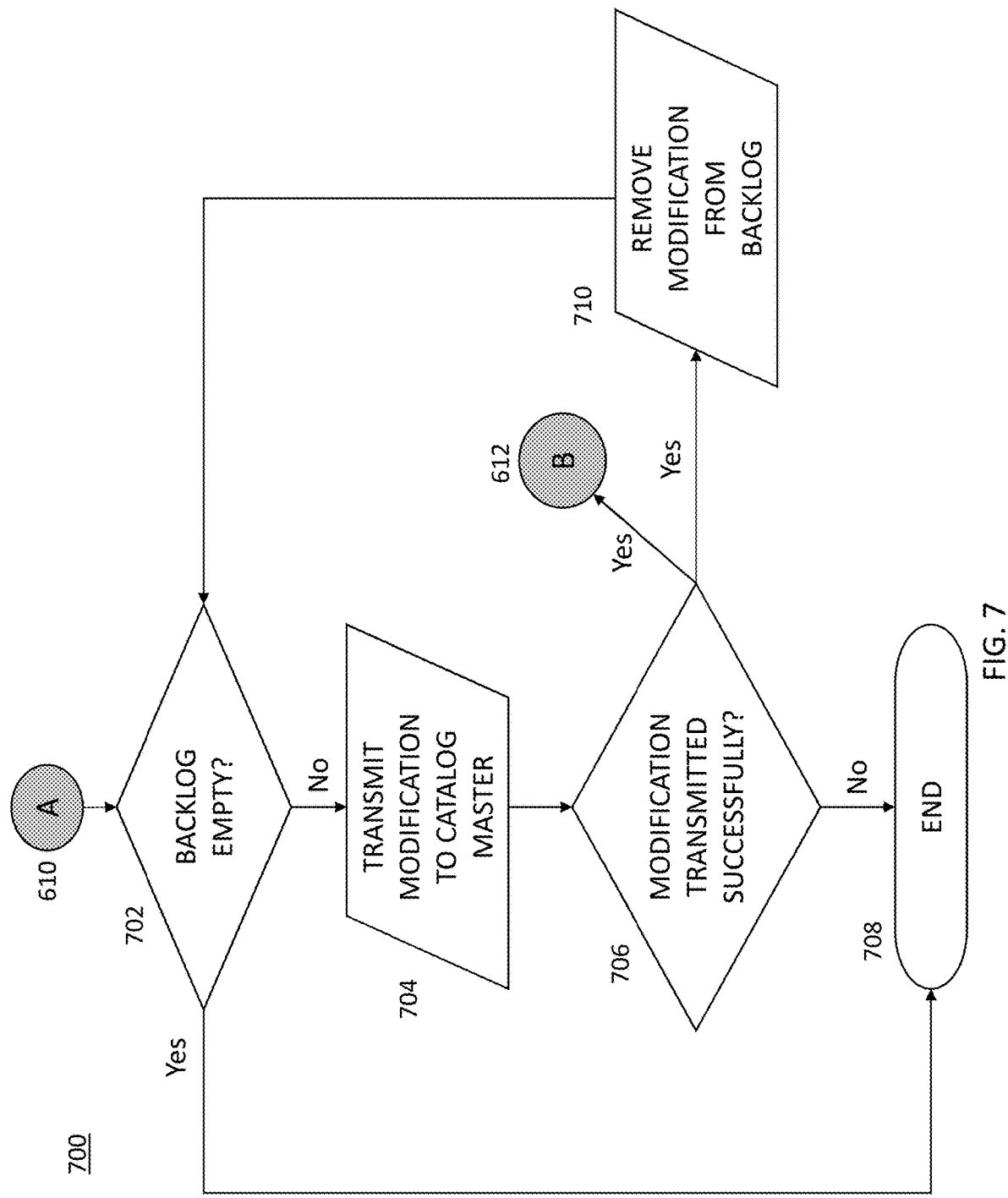
FIG. 7 illustrates a process of managing the backlog.

FIG. 7 illustrates a process 700 of managing the backlog. The service can determine, at 702, whether the backlog is empty. If the backlog is not empty, the service can transmit, at 704, the modification to the catalog master. The service can determine, at 706, whether the modification was transmitted successfully. If the modification was not transmitted successfully, or if the backlog is empty, the service can end the process 700 at 708. If the modification was transmitted successfully, the service can remove, at 710, the modification from the backlog.

Figure 8:
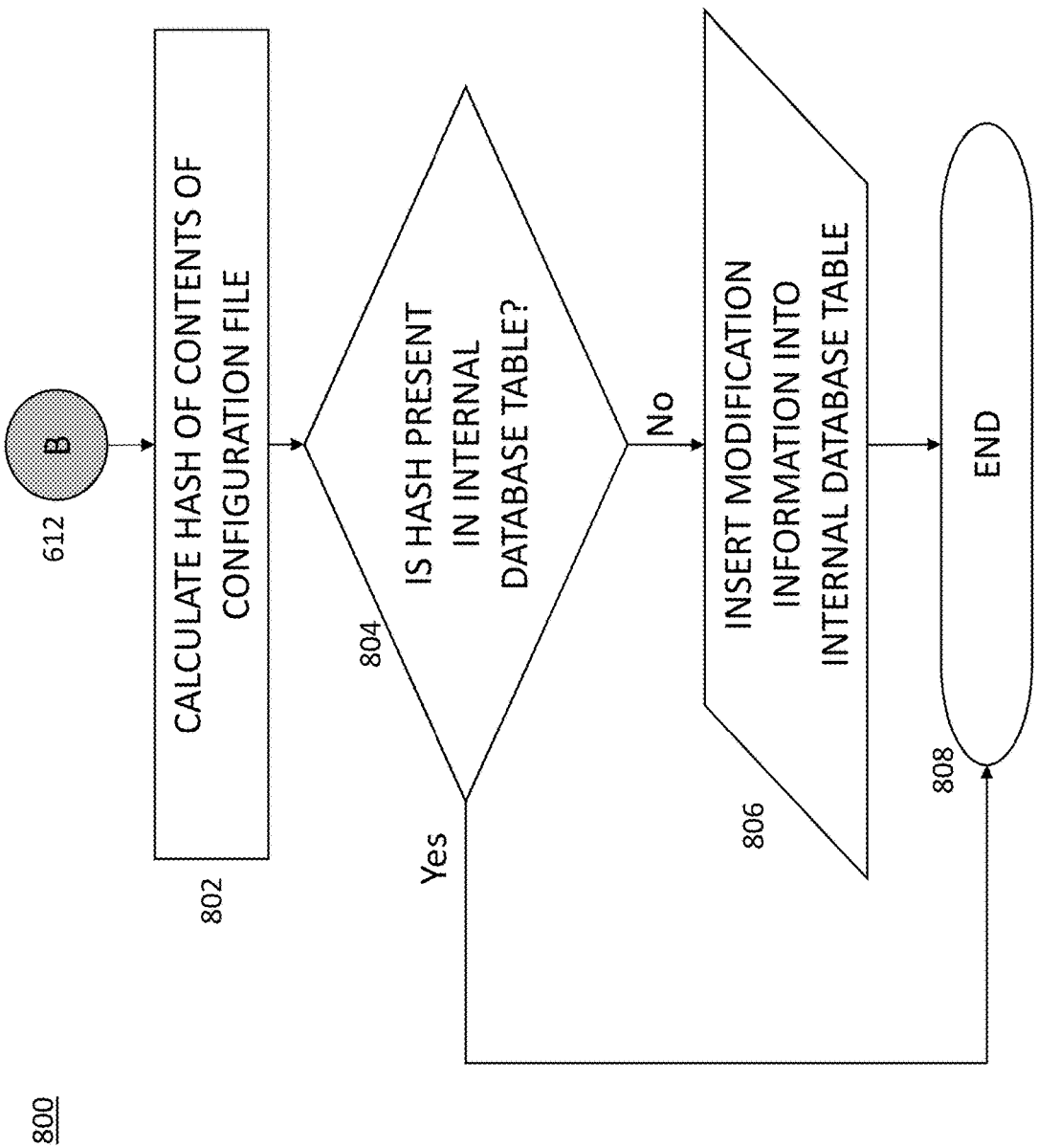
FIG. 8 illustrates a process of checking for modifications to the configuration file whenever the configuration file should be modified and documenting change when the hash of contents of the configuration file is unknown.

FIG. 8 illustrates a process 800 of checking for modifications to the configuration file at suitable points in time (e.g., whenever the configuration file should be modified, or during the service startup, or when the configuration file is read initially, or periodically, or any combination of these).

The service can calculate, at 802, the hash of contents of the configuration file. The service can determine, at 804, whether the hash is known—i.e., present in the internal database table 128. If the hash is not present in the internal database table 128, it can be assumed that the modification was made externally (i.e., not requested to a service but accomplished by directly manipulating the configuration file), and the service can insert the modification information into internal database table 128 so as to document the modification information. Such an entry documenting an external modification may only contain information about the changed configuration setting itself, but no further metadata, as there may be no source for information like user names and applications. Subsequently, or if the hash is present in the internal database table 128, the service can end, at 808, the process 800.

The documentation of the modified configuration when the hash is not present is now described. Database table entries for detected external and regular configuration file modifications can be treated slightly differently: while the former can be added by issuing an INSERT SQL statement, for the latter an UPSERT SQL statement may be used. If the INSERT statement fails due to a unique key constraint violation, this can indicate that another entry for the same configuration file and its contents was added in between the check and the statement execution. This can happen if change information is processed in different order than the files were modified (e.g., network packets arrive in different order than they were sent: other services sent information for two subsequent changes but the second arrives first, so that its previous hash value is not found in the table, because the entry for the initial change is still missing). The existing entry contains metadata, unlike the generated entry describing the change as external, and should/may therefore take precedence. This can be achieved with the UPSERT statement, which will either update an existing entry for the same configuration file or create a new record if none already exists.

Together with the use of INSERT SQL statements for configuration modification requested via a service and UPSERT SQL statements for detected external configuration changes, the unique key constraint plays a key role in dealing with out-of-order processing of change information sent to the catalog master service. The following description explains how a configuration file in SAP HANA can be uniquely identified and how the unique constraint is derived from that. The unique key of the internal database tables is composed of the HASH, FILE_NAME, LAYER_NAME and HOST columns. Whereas the last three columns uniquely identify a configuration file in a SAP HANA database installation, the HASH column uniquely identifies its contents—this works, because each configuration file starts with a comment line consisting of the date and time of its last modification and the command line of the modifying process, so that a configuration file with the same parameter settings at different points in time will have a different comment line and therefore a different hash.

A regular configuration change can thus be documented by issuing an UPSERT SQL statement for the internal database table, which can either create a new entry (if it does not exist yet) or replace an existing entry, all based on the unique constraint. This can resolve a timing issue when an external file modification is detected and documented by a service but it actually is a regular configuration change performed by another service—the latter take precedence and will override entries for external changes as they carry complete metadata.

When documenting initial as well as external modifications, the catalog master service can also store the complete contents of the configuration file in a SNAPSHOT column of the internal database table 128. Note that this initial modification refers to the detection process that can be triggered at service startup or when the configuration file is read for the first time.

Requests for modifying the configuration that originate from a user (i.e., internal requests, which are different from external changes) are processed by a service. Such requests may be well-structured, because they can be made using a SQL statement 134 with a dedicated syntax and processed by a SQL processor 122. Such SQL statement 134 may be generated by a graphical user interface 110 of an administrative tool that can be running in an application server 104. Therefore, internal configuration changes are fine-granular as they pinpoint the exact configuration parameter to be modified, and also the new value of the parameter in case the value was added or changed. External changes, on the other hand, can be detected by calculating the hash value of the configuration file's contents and determining that there is no corresponding entry in the internal database table, meaning that the particular file content is unknown and therefore differs from the previously known configuration file content. To be able to isolate the one or several configuration parameters (and their new value in case they were added or changed) in the externally-modified configuration file is crucial for documenting what exactly was changed on a fine-granular basis. This is only possible if, in addition to the documented internal changes, the database table also contains the complete contents of the configuration file at certain points in time (and at least once for the initial entry created during service start if not already there). By applying the fine-grained modifications documented for internal changes to the complete contents of the configuration file, it can be rolled-forward to the last known state (i.e., the most recent entry in the internal database table 128). Because the configuration files are stored in structured file formats (e.g., SAP HANA uses the widely-known INI file format, but XML would also be an option), the last known state reconstructed from the snapshot and the internal modifications can be compared with the current state to determine exactly what was changed. This can then be documented (without the reason for the change and the usually accompanying metadata) but nevertheless in a fine-grained fashion.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatuses, methods, and/or articles. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
    collecting, by a service provided by a database management system, metadata associated with a request to modify a configuration file for changing a behavior of a component of the service provided by the database management system, the database management system including a default configuration layer, a database tenant layer, and a host layer, the configuration file is one of: a first configuration file having a default setting and stored in the default configuration layer, the first configuration file being a global or a service-specific configuration file, a second configuration file configured to override the default setting and stored in the database tenant layer, and a third configuration file configured to modify database behavior of a host within the database management system and stored in the host layer;
    modifying, by the service, the configuration file in response to the request, the modification changing behavior of the component of the service; and
    generating, by the service, data representing documentation of the modification to the configuration file and the metadata, the data representing the documentation being configured for storage by the database management system.

2. The method of claim 1, wherein the database management system is a relational database management system.

3. The method of claim 1, wherein:
    the service is one of a plurality of services provided by the database management system; and
    the component is one of a plurality of components of the service.

4. The method of claim 1, wherein the modification of the configuration file is performed by one of:
    a first database administrator while configuring the database management system to match hardware settings of a customer serviced by the database management system;
    a second database administrator for a tenant of the database management system while adapting the service for a particular use case; and
    a support worker while troubleshooting the database management system.

5. The method of claim 1, wherein the plurality of parameters comprises:
    the modification to the configuration file; and
    at least one of:
        a reason due to which the configuration file was modified;
        a time when the configuration file was modified;
        an application used for requesting a modification of the configuration file; and
        an identification of a user who requested the modification of the configuration file.

6. The method of claim 1, wherein the generating of the data representing the documentation comprises:
  transmitting, by the service, metadata of the modification to the configuration file to a catalog master service that stores the metadata of the modification in an internal database table within the database management system.

7. The method of claim 6, wherein:
  the catalog master service stores the metadata of the modification in a backlog for a duration for which the catalog master file is unavailable; and
  the catalog master service transmits the metadata of the modification from the backlog to the catalog master file when the catalog master file becomes available.

8. The method of claim 1, further comprising:
  displaying, by the service, the modification stored in the internal database table from an in-memory storage structure of the database management system.

9. The method of claim 1, further comprising:
  if a lock file exists, recovering, by the service, the lock file; and
  if the lock file does not exist, creating, by the service, a new lock file;
  wherein:
    the recovered lock file or the new lock file is used during performance of the modification of the configuration file.

10. A non-transitory computer-readable medium storing instructions that, when executed by a computer, cause a service provided by a database management system to perform operations comprising:
  collecting, by a service provided by a database management system, metadata associated with a request to modify a configuration file for changing a behavior of a component of the service provided by the database management system, the database management system including a default configuration layer, a database tenant layer, and a host layer, the configuration file is one of: a first configuration file having a default setting and stored in the default configuration layer, the first configuration file being a global or a service-specific configuration file, a second configuration file configured to override the default setting and stored in the database tenant layer, and a third configuration file configured to modify database behavior of a host within the database management system and stored in the host layer;
  modifying, by the service, the configuration file in response to the request, the modification changing behavior of the component of the service; and
  generating, by the service, data representing documentation of the modification to the configuration file and the metadata, the data representing the documentation being configured for storage by the database management system.

11. The non-transitory computer-readable medium of claim 10, wherein the database management system is a relational database management system.

12. The non-transitory computer-readable medium of claim 10, wherein the plurality of parameters comprises:
  the modification to the configuration file; and
  at least one of:
    a reason due to which the configuration file was modified;
    a time when the configuration file was modified;
    an application used for requesting a modification of the configuration file; and
    an identification of a user who requested the modification of the configuration file.

13. The non-transitory computer-readable medium of claim 10, wherein the generating of the data representing the documentation comprises:
  transmitting metadata of the modification to the configuration file to a catalog master service that stores the metadata of the modification in an internal database table within the database management system.

14. The non-transitory computer-readable medium of claim 13, wherein:
  the catalog master service stores the metadata of the modification in a backlog for a duration for which the catalog master file is unavailable; and
  the catalog master service transmits the metadata of the modification from the backlog to the catalog master file when the catalog master file becomes available.

15. The non-transitory computer-readable medium of claim 10, wherein the operations further comprise:
  if a lock file exists, recovering the lock file; and
  if the lock file does not exist, creating a new lock file;
  wherein:
    the recovered lock file or the new lock file is used during performance of the modification of the configuration file.

16. A database management system comprising:
  a programmable processor providing a service; and
  a machine-readable medium storing instructions that, when executed by the programmable processor, cause the service to perform at least some of operations comprising:
    collecting, by a service provided by a database management system, metadata associated with a request to modify a configuration file for changing a behavior of a component of the service provided by the database management system, the database management system including a default configuration layer, a database tenant layer, and a host layer, the configuration file is one of: a first configuration file having a default setting and stored in the default configuration layer, the first configuration file being a global or a service-specific configuration file, a second configuration file configured to override the default setting and stored in the database tenant layer, and a third configuration file configured to modify database behavior of a host within the database management system and stored in the host layer;
    modifying, by the service, the configuration file in response to the request, the modification changing behavior of the component of the service; and
    generating, by the service, data representing documentation of the modification to the configuration file and the metadata, the data representing the documentation being configured for storage by the database management system.

17. The database management system of claim 16, wherein the generating of the data representing the documentation comprises transmitting metadata of the modification to the configuration file to a catalog master service that stores the metadata of the modification in an internal database table within the database management system.

* * * * *